United States Patent [19]

Piccone et al.

[11] 3,955,131
[45] May 4, 1976

[54] CIRCUIT FOR CONTROLLING THE REVERSE CURRENT IN A CONTROLLED RECTIFIER

[75] Inventors: Dante E. Piccone, Glenmoore; Istvan Somos, Lansdowne, both of Pa.

[73] Assignee: General Electric Co., Philadelphia, Pa.

[22] Filed: Sept. 8, 1975

[21] Appl. No.: 611,474

[52] U.S. Cl. ............................ 321/25; 321/27 R; 321/44
[51] Int. Cl.[2] ........................................ H02M 7/00
[58] Field of Search ................... 321/9–14, 321/25, 43–45, 45 C

[56] References Cited
UNITED STATES PATENTS

| | | | |
|---|---|---|---|
| 3,328,667 | 6/1967 | Shaneman | 321/45 R |
| 3,328,674 | 6/1967 | Bleicher | 321/25 X |
| 3,386,027 | 5/1968 | Kilgore et al. | 321/11 |
| 3,412,312 | 11/1968 | Rice | 321/27 R X |
| 3,609,511 | 9/1971 | Risberg | 321/45 C X |
| 3,626,271 | 12/1971 | Dewey | 321/27 R X |

*Primary Examiner*—William M. Shoop
*Attorney, Agent, or Firm*—Joseph H. Yamaoka; J. Wesley Haubner

[57] ABSTRACT

A circuit for controlling the reverse recovery current in a controlled rectifier. The primary winding of a saturable reactor is connected in series with the controlled rectifier. A diode in parallel with a resistor is connected in circuit with the secondary winding of the saturable reactor. The diode is poled to provide a low impedance in the reactor secondary when current flows through the primary winding and through the forward direction of the controlled rectifier. The reverse recovery current of the controlled rectifier flowing through the primary winding of the reactor causes current in the secondary winding to flow in the reverse direction of the diode. The value of the resistor as reflected into the saturable reactor primary circuit limits the magnitude of the reverse recovery current.

10 Claims, 7 Drawing Figures

CIRCUIT FOR CONTROLLING THE REVERSE CURRENT IN A CONTROLLED RECTIFIER

BACKGROUND OF THE INVENTION

This invention relates to a circuit for controlling the reverse recovery current that flows in a controlled rectifier and in particular to a circuit for controlling the duration of the reverse recovery current and for controlling the time rate of change of the reverse recovery current.

It is well known that when a controlled rectifier device, such as a silicon controlled rectifier (SCR), is switched from the forward conducting state to the reverse blocking state, a transient reverse recovery current flows through the SCR that greatly exceeds the normal reverse blocking current. The duration of this reverse recovery current flow is dependent on the characteristic of the particular SCR as well as upon the components in circuit with the SCR. A more detailed discussion of the reverse recovery current characteristic of SCR's is given at pages 68 and 69 of the SCR Manual, Fifth Edition, published by General Electric Company, Syracuse, N.Y. 13201.

It is well known that in certain high voltage circuit applications a plurality of series connected SCR's can be connected between a power source and the load. As described at pages 150–159 of the SCR Manual, supra, it is necessary in such applications to employ an equalization network, or snubber circuit, consisting of a resistor in series with a capacitor, connected across the main terminals of each SCR. This equalization network limits the voltage buildup on the fastest SCR to recover thereby preventing the full reverse voltage from being applied across the fastest SCR. As long as a SCR is conducting in the reverse direction its corresponding equalization capacitor remains discharged. When the fastest SCR begins to regain its blocking capability its corresponding equalization capacitor will begin charging. When the next fastest SCR begins to regain its blocking capability its corresponding equalization capacitor will then begin charging. As the equalization capacitors charge up to attain the appropriate fractional share of the applied reverse voltage, the capacitor associated with the fastest SCR will reach a voltage that exceeds its fractional share of the applied reverse voltage. As a result, the reverse voltage rating of the fastest SCR is not determined by the fractional share of the reverse applied voltage but is determined by the fact that the transient voltage across its equalization capacitor can attain a value that is in excess of the fractional share of the reverse applied voltage.

It can be seen that it would be desirable to have all of the SCR's regain their blocking capability at the same time because then each of the associated equalization capacitors will begin charging at the same time and, theoretically, the voltage developed across each equalization capacitor could be made not to exceed its fractional share of the reverse applied voltage. In that case the reverse voltage rating of the SCR would be determined solely by the fractional share of the reverse applied voltage. Of course, one solution to the problem would be to select SCR's that have the same recovery current durations. This is a time consuming operation which can be eliminated by using the circuit of our invention. For a more detailed discussion of circuits employing a plurality of series connected SCR's see pages 149 to 160 of the SCR Manual, supra.

It is also desirable to control the time rate of change of the reverse recovery current through the SCR. One prior art approach for controlling the reverse recovery current uses an inductor or saturating inductor in series with the SCR. A diode is connected in parallel with the inductor and is poled to conduct current in the forward direction of the SCR. The diode acts to short out the inductor when current is being conducted from the source to the load through the forward direction of the SCR, while current coming from the load to the source through the reverse direction of the SCR is not able to flow through the reverse direction of the diode and, therefore, is diverted through the inductor which acts to limit the time rate of change of the reverse recovery current. In this prior art arrangement the forward current rating of the diode is determined by the full load current that flows through the SCR.

It is an object of our invention to provide circuits for controlling the duration of reverse recovery current flowing in an SCR.

It is another object of our invention to provide a circuit in which a plurality of series connected SCR's are used to conduct current from a source to a load and to provide circuits whereby the SCR's will have equal reverse recovery current durations.

It is a further object of our invention to provide an improved circuit for limiting the time rate of change of the reverse recovery current through an SCR.

SUMMARY OF THE INVENTION

In accordance with our invention a power source is connected to a load through a plurality of series connected SCR's. Each SCR has a corresponding saturable reactor having a primary winding and a secondary winding, the primary winding being connected in series with the SCR and the load. The secondary winding of each reactor is connected in series with a diode and the series combination is connected in parallel with its corresponding primary winding. A resistor is connected in parallel with each diode. Each secondary winding is poled so that when current flows from the source to the load through the forward direction of the SCR's and through the primary and secondary windings, opposing flux is produced in the core. The diode is poled so that current can flow from the source to the load through the forward direction of the SCR's and through the forward direction of the diode. When the SCR's are conducting current from the source to the load, current flows through the primary and secondary windings of the saturable reactor and through the forward direction of the diodes. Since the current through the primary and secondary windings of the saturable reactor produce very nearly equal but opposing flux in the core, the saturable reactor presents a very low impedance to the current flowing from the source to the load through the forward direction of the SCR's. When the SCR's are switched to the non-conductive state and reverse recovery current flows from the load to the source through the reverse direction of the SCR's, the diode in series with the secondary winding of the saturable reactor become reverse biased and the amount of current that can flow through the secondary of the saturable reactor is limited by the resistor in parallel with the diode. The amount of current that flows in the primary winding of the saturable reactor is determined by the turns ratio of the windings and the total current that flows through the corresponding SCR is the sum of the current flowing in the primary and secondary windings.

Since the reverse recovery characteristic of a particular SCR can be approximated by the product of reverse recovery current level and reverse recovery current duration, and since the reverse recovery current level can be adjusted by controlling the magnitude of the resistor in parallel with the diode, it is clear that the reverse recovery current duration of the SCR can be selected by adjusting the magnitude of the resistor in parallel with the diode and that all of the resistors can be adjusted so that all of the SCR's have very nearly equal reverse recovery current durations.

In another embodiment of our invention the secondary winding of each saturable reactor is not connected in circuit with the SCR but is connected in parallel with a diode and with a resistor.

In another aspect of our invention a power source is connected to a load through an SCR. The primary winding of a saturable reactor is connected in series with the SCR and the load. The secondary winding of the saturable reactor is connected in series with a resistor and with a diode and the entire series combination is connected in parallel with the primary winding of the reactor. The secondary winding of the reactor is poled so that current flowing from the source through the primary and secondary windings of the reactor and through the forward direction of the SCR produce opposing flux in the core. The diode is poled so that current flowing from the source to the load through the forward direction of the SCR flows through the forward direction of the diode. The resistor in series with the secondary winding is adjusted so that when current flows from the power source to the load and through the forward direction of the SCR the current flowing through the primary and secondary windings of the reactor produces some net flux in the core. When the SCR is switched to the non-conductive state, the diode in series with the secondary winding of the saturable inductor prevents the reverse recovery current of the SCR from flowing through the secondary winding. Since all of the reverse recovery current flows through the primary winding of the saturable inductor, a large net flux is produced in the core and the saturable reactor inductance limits the rate of change of the reverse recovery current.

DESCRIPTION OF THE DRAWINGS

While the specification concludes with claims particularly pointing out and distinctly claiming that which is regarded as the present invention the objects and advantages of this invention can be more readily ascertained from the following description of a preferred embodiment when read in conjunction with the accompanying drawings in which:

DETAILED DESCRIPTION

Figure 1:
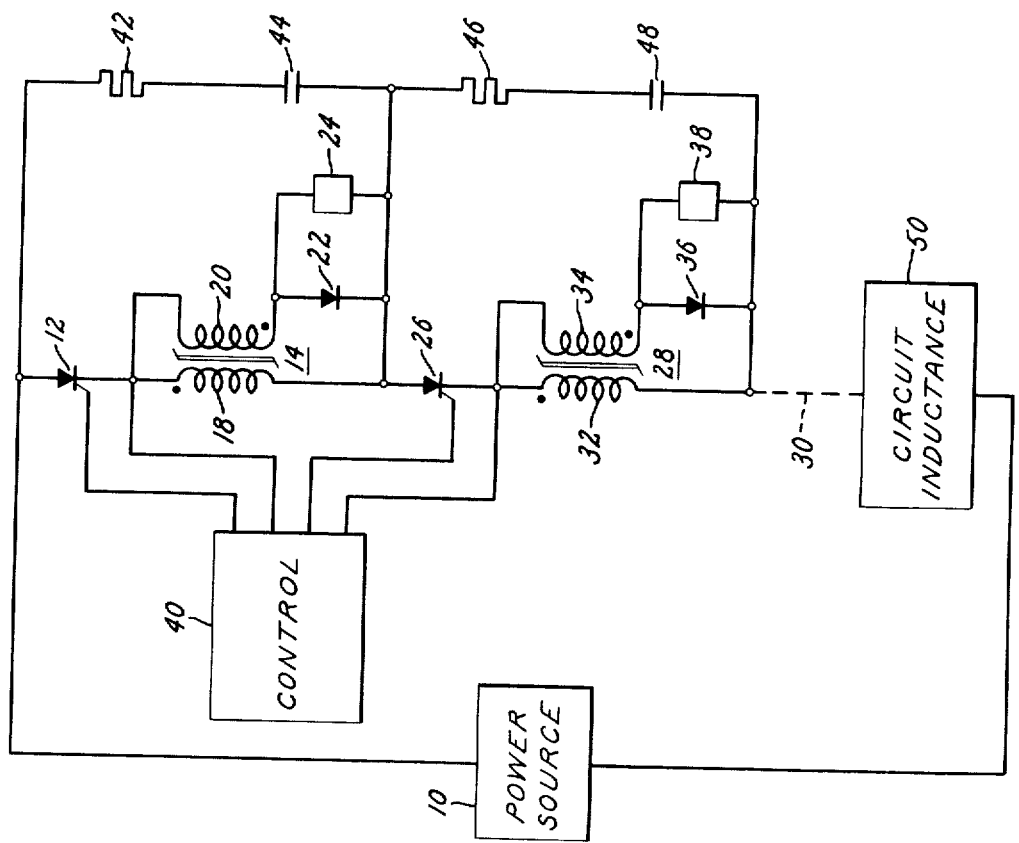
FIG. 1 is a schematic diagram of one embodiment of a circuit for controlling the reverse recovery current duration of an SCR.

Referring now to FIG. 1 there is shown a power source 10 connected to a load 50 through a plurality of series connected SCR's 12, 26. As indicated by the dashed line 30, additional SCR's can be connected in series between the source 10 and the load 50. It will be recognized by those skilled in the art that the power source 10 could be one phase of a three phase power system and that SCR's 12 and 26 could be part of a valve used in a high voltage converter and that the load 50 could consist of a second valve connected to a second phase of the three phase power system as described in U.S. Pat. No. 3,423,664-Dewey. Each SCR 12, 26 has associated with it a saturable reactor 14, 28 having a primary winding 18, 32 and a secondary winding 20, 34, wound on a core (not shown). The primary winding 18 of saturable reactor 14 is connected in series with SCR 12 and load 50, and the primary winding 32 of saturable reactor 28 is connected in series with SCR 26 and load 50. The secondary winding 20 of saturable reactor 14 is connected in series with a diode 22 and the resulting series combination is connected in parallel with primary winding 18. An impedance 24, preferably a resistor, is connected in parallel with diode 22. The secondary winding 20 is poled so that when current flows from the power source 10 to the load 50 through the forward direction of SCR 12 and through the primary and secondary windings 18, 20, the flux produced in the reactor core due to current flowing in the secondary winding 20 opposes the flux produced due to current flowing in the primary winding 18. The diode 22 is poled to conduct current through its forward direction when the current flows from the power source 10 to the load 50 through the forward direction of SCR12. Secondary winding 34 of saturable reactor 28, diode 36 and resistor 38 are similarly connected in circuit with primary winding 32. As shown in the Figure, an equalization network, or snubber circuit, consisting of resistor 42 in series with capacitor 44 is connected from the anode of SCR 12 to the anode of SCR 26 and a similar equalization network consisting of resistor 46 and capacitor 48 is connected from the anode of SCR 26 to the cathode of diode 36. A control block 40 generates trigger signals at the gate inputs of SCR's 12 and 26 when it is desired to cause the SCR's to switch from the non-conductive to the conductive state. Circuits for providing these gate trigger signals are well known in the art and will not be further described in this application. An example and description of the circuitry for performing the gate trigger control function is provided in the aforementioned Dewey patent.

Figure 3:
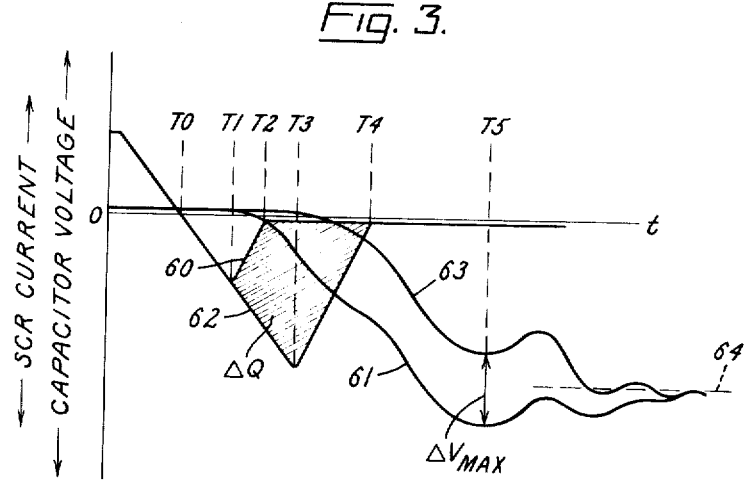
FIG. 3 shows the voltage across the equalization capacitor as a function of the time when the SCR's have unequal reverse recovery current durations.

FIG. 3 illustrates how the voltage builds up on equalization capacitors 44 and 48 when SCR's 12 and 26 have different reverse recovery current durations. For the purposes of this explanation, the SCR reverse recovery current characteristic has been approximated by a plurality of constant slope line segments. The curve 60 represents the reverse recovery current characteristic for, let us say, SCR 12, and the curve 62 represents the reverse recovery current characteristic for SCR 26. Curve 61 represents the voltage developed across equalization capacitor 44 which is in circuit with SCR 12 and curve 63 represents the voltage developed across equalization capacitor 48 which is in circuit with SCR 26. From curve 60 it can be seen that from T0 to T1 SCR 12 has a very low resistance. At T1 SCR 12 begins to recover its blocking capability and at T2 SCR 12 has regained its full reverse blocking capability. Similarly, curve 62 shows that from T0 to T3 SCR 26 has a very low resistance, and at T3 SCR 26 begins to regain its reverse blocking capability, and at T4 SCR 26 has regained its full reverse blocking capability. Curve 61 shows that equalization capacitor 44 remains discharged as long as SCR 12 is fully conductive and begins charging at time T1 when SCR 12 begins to regain its reverse blocking capability. The curve 63 shows that the equalization capacitor 48 remains discharged as long as SCR 26 is fully conductive and begins charging at time T3 when SCR 26 begins to regain its reverse blocking capability. Thus, it can be seen that at time T3 when the voltage across equalization capacitor 48 begins building up, a considerable voltage has already built up across equalization capacitor 44. From time T4 the buildup of the voltages across equalization capacitors 44 and 48 will be determined by the values of the equalization network components as well as the impedance of the load which in many applications is highly inductive. As a result, the voltages developed across equalization capacitors 44 and 48 will follow a transient path, as shown, and finally settle out to a voltage equal to a corresponding fractional share of the total reverse applied voltage as represented by the dashed line 64. During the transient condition the voltage developed across the equalization capacitor 44 will reach a maximum value at time T5 that exceeds its corresponding fractional share of the reverse applied voltage. Thus, in the design of the circuit, the reverse applied voltage rating of SCR 12 is not determined by the fractional share of the reverse applied voltage but is determined by the maximum voltage across equalization capacitor 44 during this transient condition. The amount, $\Delta v$, that the voltage developed across equalization capacitor 44 exceeds its corresponding share of the reverse applied voltage is proportional to the shaded area $\Delta Q$ shown in FIG. 3. This shaded area $\Delta Q$ is the area between curve 60 and curve 62 from time T1 to time T4. It is the purpose of the circuitry provided in FIG. 1 to cause SCR's 12 and 26 to have equal reverse recovery current durations thereby minimizing the area $\Delta Q$ between the curve 60 and the curve 62 from time T1 to time T4.

Figure 4:
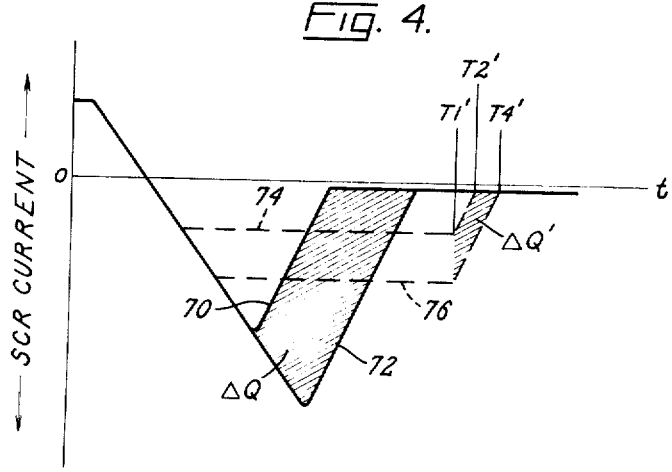
FIGS. 4 and 5 illustrate SCR reverse current as a function of time.

The operation of the circuit of FIG. 1 will now be explained. When the control block 40 triggers SCR's 12 and 26 to conduct in the forward direction, current flows from the power source 10 to the load 50 through the forward direction of SCR's 12 and 26, through the primary and secondary windings of saturable reactors 14 and 28, and through the forward direction of diodes 22 and 36. Since the forward impedance of diodes 22 and 36 are small, and since the current flowing in the primary and secondary windings of saturable reactors 14 and 28 produce zero net flux in the cores, the saturable inductors 14 and 28 and diodes 22 and 36 have little effect on the flow of current from the power source 10 to the load 50. When the SCR's 12 and 26 are switching from the conductive to the non-conductive state, and, due to the reverse recovery characteristic of the SCR's, reverse current tends to flow from the load 50 to the source 10, diodes 22 and 36 become non-conductive so that the reverse current flowing in secondary winding 20 is determined by the value of resistor 24, and the reverse current flowing through secondary winding 34 is determined by the value of resistor 38. The total reverse current that is allowed to flow through SCR 12 is determined by the value of resistor 24 and the turns ratio of the reactor 14 windings, and the total reverse current that is allowed to flow through SCR 26 is determined by the value of resistor 38 and the turns ratio of the reactor 28 windings. By adjusting the magnitude of resistors 24 and 38 so that the total recovery current flowing through SCR's 12 and 26 is less than the maximum recovery current that would flow in the absence of these circuits, the recovery current duration of each SCR can be controlled. This is illustrated in FIG. 4 wherein the curves 70 and 72 represent the reverse recovery characteristic of SCR's 12 and 26 in the absence of the control circuitry described in FIG. 1 and the curves 74 and 76 represent the reverse recovery characteristic of SCR's 12 and 26 with the control circuitry as described in FIG. 1. By adjusting the value of resistors 24 and 38 the reverse recovery current characteristic of SCR's 12 and 26 can be modified so that both SCR's remain conductive until time T1'. At time T1' SCR's 12 and 26 both begin to regain their reverse blocking capability. At time T2' SCR 12 has completely regained its reverse blocking capability, and at time T4' SCR 26 has regained its reverse blocking capability. The shaded area $\Delta Q'$ is the area between curves 74 and 76 from time T1' to time T4'. Since the difference between the maximum voltage developed across equalization capacitor 44 and the appropriate fractional share of the reverse applied voltage is determined by the area $\Delta Q'$, and since the area $\Delta Q'$ is considerably less than the area $\Delta Q$, it follows that the maximum voltage developed across equalization capacitor 44 in the circuit of FIG. 1 is less than the maximum voltage developed across the equalization capacitor 44 in the absence of the control circuitry described in FIG. 1. As a result, a SCR having a lower reverse voltage rating can be employed in the circuit of FIG. 1.

Figure 5:
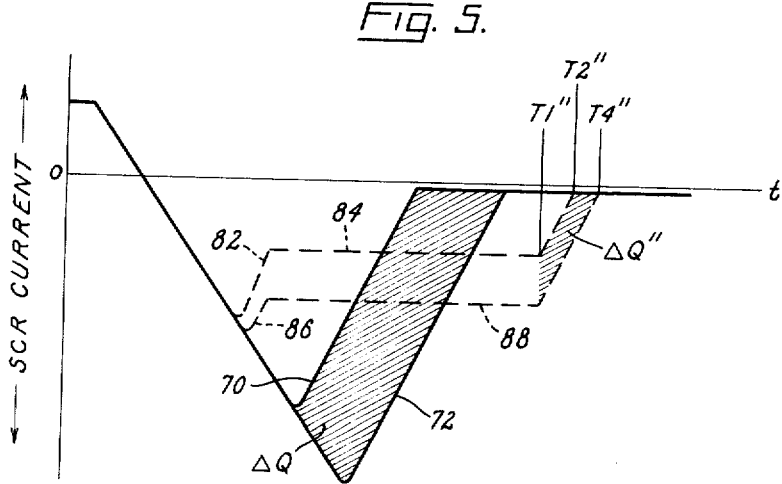

The reverse recovery current characteristics depicted in FIG. 4 assumed that diodes 22 and 36 are capable of instantly regaining their reverse blocking capability. FIG. 5 illustrates the reverse recovery current characteristic for SCR's 12 and 26 which result when diodes 22 and 36 do not instantly regain their reverse blocking capability. The modified reverse recovery current characteristic, curve 84, for SCR 12 has a variable conducting portion 82 during which the reverse recovery characteristic of the diode 22 determines the amount of reverse current flowing through SCR 12, and a flat portion 84 during which the resistor 24 determines the amount of reverse recovery current flowing through SCR 12. Similarly, the modified reverse recovery current characteristic for the SCR 26 is shown to have a variable current portion 86 as determined by the reverse recovery characteristic of diode 36 and a flat portion 88 as determined by the value of resistor 38.

Figure 2:
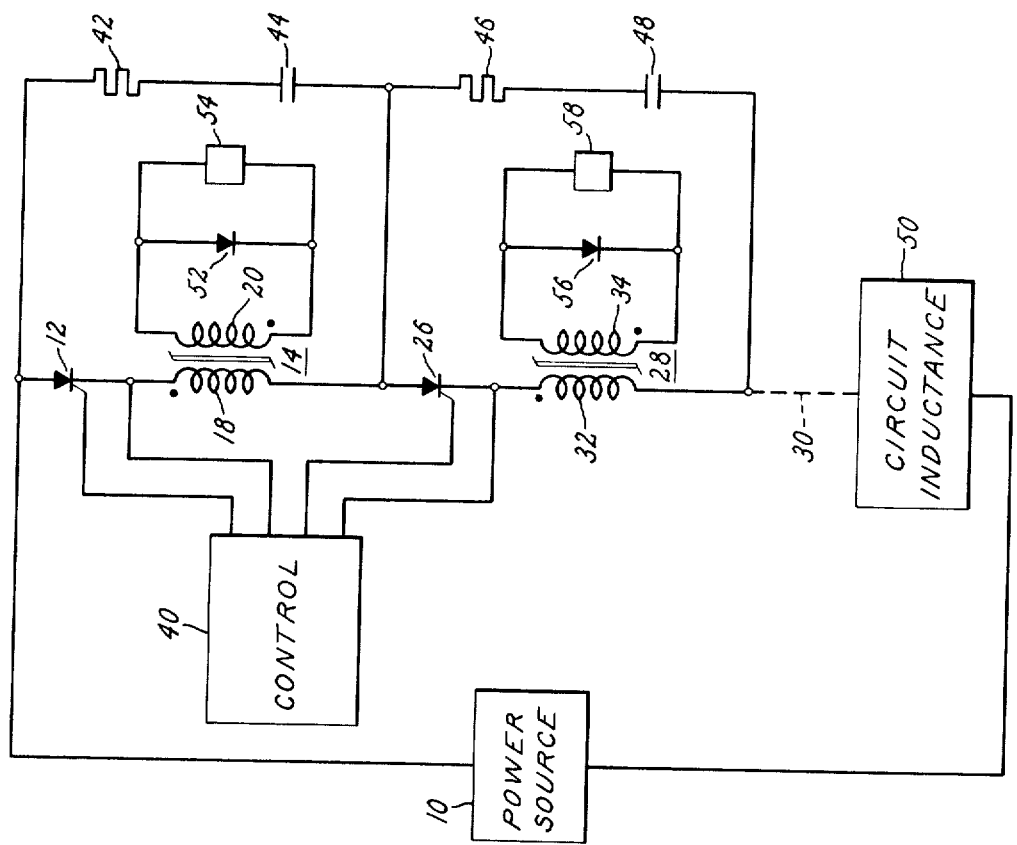
FIG. 2 is a schematic diagram of a second embodiment of a circuit for controlling the reverse recovery current of an SCR.

FIG. 2 is another embodiment of a circuit for modifying the reverse recovery current duration of a SCR. For the sake of convenience, certain elements depicted in FIG. 3 have retained element designations as assigned in FIG. 1. In a manner similar to the circuit shown in FIG. 1, SCR's 12 and 26 are connected in series with the primary windings 18 and 32 of reactors 14 and 28 and in series with the power source 10 and the load 50. Each SCR 12, 26 and its associated primary winding 18, 32 is connected in parallel with a corresponding equalization network consisting of resistor 42 and capacitor 44 and resistor 46 and capacitor 48, respectively. In this alternate embodiment the secondary winding 20 of reactor 14 is connected in parallel with a diode 52 and with an impedance 54. Similarly, the secondary winding 34 of inductor 28 is connected in parallel with diode 56 and impedance 58. Diodes 52 and 56 are poled so that when current flows from the power source 10 to the load 50 through the forward direction of SCR's 12 and 26 and through the primary windings 18 and 32, the induced current flowing in the secondary windings 20 and 34 flow through the forward direction of the diodes 52 and 56. The low forward impedance of diodes 52 and 56 results in a low reflected impedance in the primary circuit of reactors 14 and 28 and, therefore a low impedance to current flowing from the source 10 to the load 50. When SCR's 12 and 26 are being switched from the conductive to the non-conductive state, the reverse recovery current flowing in the primary windings 18 and 32 of reactors 14 and 28 causes the current to flow in the reverse direction in secondary windings 20 and 34. Since this reverse current direction is in the reverse direction of diodes 52 and 56, the amount of current flowing in secondary windings 20 and 34 is determined by impedances 54 and 58 which in a preferred embodiment are resistors. The magnitude of the currents flowing in secondary windings 20 and 34 determines the magnitude of the currents flowing in the primary windings 18 and 32 in accordance with the turns ratio of the windings. Thus, it can be seen that the magnitude of the reverse current flowing through SCR 12 is controlled by adjusting the value of resistor 54 and the magnitude of the reverse recovery current flowing through SCR 26 is controlled by adjusting the magnitude of resistor 58. As explained in describing the circuit of FIG. 1, resistors 54 and 58 can be adjusted so that SCR's 12 and 26 have very nearly equal reverse recovery current durations.

Figure 6:
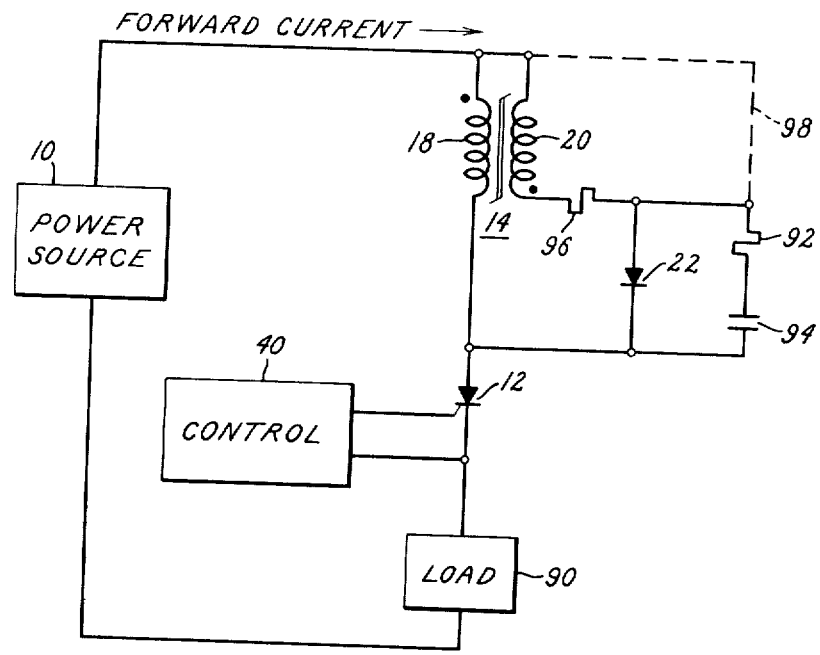
FIG. 6 is a schematic diagram of a circuit that limits the time rate of change of the reverse recovery current of an SCR.

Referring now to FIG. 6, there is shown a circuit for controlling the time rate of change of the reverse recovery current SCR. As shown in the Figure, SCR 12 is connected in series with a power source 10 and a load 50. The primary winding 18 of saturable reactor 14 is connected in series with the power source 10 and SCR 12. The secondary winding 20 of reactor 14 is connected in series with resistor 96 and with diode 22 and the series combination is connected in parallel with the primary winding 18 of reactor 14. The secondary winding 20 of inductor 14 is poled so that when current flows from the source 10 through the primary and secondary windings of inductor 14 and through the forward direction of SCR 12, opposing flux is produced in the core of inductor 14. Diode 22 is poled to conduct current from the source 10 to the load 50 through the forward direction of diode 22. If desired, a snubber circuit consisting of resistor 92 in series with capacitor 94 can be placed in parallel with diode 22. A control block 40 supplies trigger pulses to the gate of SCR 12 for triggering SCR 12 from the non-conductive state to the conductive state.

Figure 7:
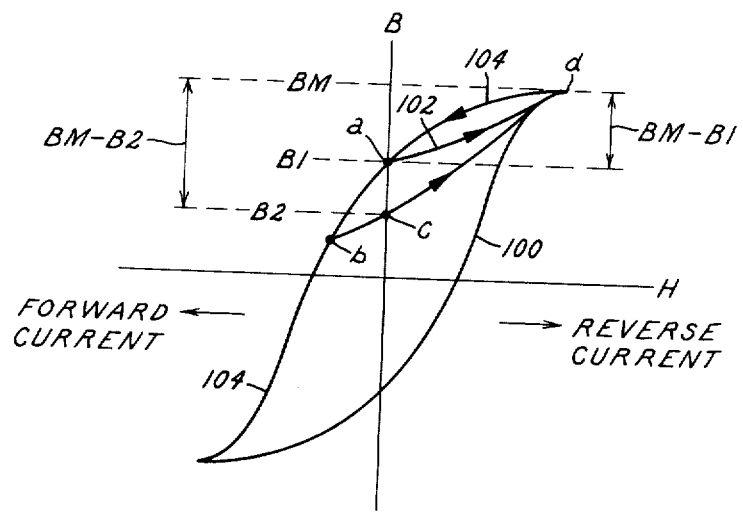
FIG. 7 is a B-H curve illustrating the operation of the saturable reactor core of the circuit shown in FIG. 6.

Before describing the operation of the circuit shown in FIG. 6, let us consider one prior art circuit for limiting the time rate of change of reverse recovery current through the SCR 12. This prior art circuit can be obtained by placing a short circuit 98 across the secondary winding 20 and resistor 96 as shown by dashed line 98 in FIG. 6. In this prior art circuit, when the SCR 12 is triggered to the conductive state current flows from the power source 10 through short circuit 98, through the forward direction of diode 22 and through the forward direction of SCR 12 to the load. When SCR 12 is switched from the conducting to the non-conducting state the reverse recovery current cannot flow through the reverse direction of diode 22 and, therefore, all of the reverse current must flow through the inductor winding 18. The inductance of winding 18 limits the time rate of change of the reverse recovery current flowing through SCR 12. One disadvantage of the prior art circuit is that diode 22 must be rated to carry the full load current. Another disadvantage of the prior art circuit is that the core is not efficiently used to provide the required circuit inductance. In FIG. 7, lines 100 and 104 define the hysteresis loop for a typical inductor core material. For the prior art single winding inductor, as the reverse recovery current builds up from zero to a maximum, the flux density increases from B1 to BM along path 102 and as the reverse recovery current subsides, the flux density goes from BM to B1 via path 104. The inductance of the prior art winding 18 will be proportional to the change in flux BM minus B1.

In the circuit of our invention the current flowing from the power source 10 to the load 50 through the forward direction of SCR 12 flows through both the primary winding 18 and the secondary winding 20 of saturable reactor 14. In a preferred embodiment the secondary winding 20 has more turns than the primary winding 18 and, therefore, only a fraction of the total current flowing through the forward direction of SCR 12 flows through the forward direction of diode 22.

We have also found that the core can be more efficiently utilized by adjusting the value of resistor 96 so that some net flux flows in the reactor core when current is flowing from the power source 10 to the load 50 through the forward direction of SCR 12. As a result the variation of flux density versus magnetic intensity will vary from point a to point b along curve 104 of FIG. 7 as the forward current increases to a maximum, and as the forward current returns to zero the variation of flux density versus magnetic intensity will go from point b to point c. As the reverse recovery current increases from zero to a maximum, the flux density will vary from B2 to BM over path cd and as the reverse recovery current returns to zero, the flux density will vary from BM to B1 along curve 104. It can be seen that the inductance of winding 18 in response to the rising reverse recovery current is proportional to BM minus B2 which is greater, for the same core, than that obtained with the prior art circuit.

While the present invention has been described with reference to a specific embodiment thereof it will be obvious to those skilled in the art that various changes and modifications may be made without departing from the invention in its broader aspects.

It is contemplated in the appended claims to cover all variations and modifications of the invention which come within the true spirit and scope of the invention.

What is claimed as new and desired to be secured by letters patent of the United States is:

1. A circuit for controlling current flow between a source and a load comprising:
   a. controlled rectifier means adapted to be connected in series with the source and the load for selectably controlling the flow of current from the source to the load;

b. a saturable reactor having primary and secondary windings wound on a core, said primary winding connected in series with the controlled rectifier and the load; and c. impedance means connected in series with the saturable reactor secondary winding, the series combination of the impedance and the secondary winding being connected in parallel with the primary winding, said secondary winding being poled so that current flowing from the source through the forward direction of the controlled rectifier and through the primary and secondary windings produce opposing flux in the core, said impedance means presenting a low impedance to current flowing in the forward direction of the controlled rectifier and in the secondary winding and a higher impedance to current flowing in the reverse direction of the controlled rectifier and in the secondary winding, whereby the duration of said reverse current flow can be adjusted by varying the magnitude of said higher impedance.

2. A circuit as recited in claim 1 wherein the impedance comprises:

a. a diode poled to conduct current from the source to the load through the forward direction of the diode; and b. a resistor connected in parallel with the diode, the value of the resistor determining said duration of reverse current flow.

3. A circuit for controlling current flow between a source and a load comprising:

a. a plurality of controlled rectifier means similarly poled and adapted to be connected in series with the source and the load for selectably controlling the flow of current from the source to the load;

b. a corresponding plurality of saturable reactors each having a primary winding and a secondary winding wound on a core, said primary windings being connected in series with its corresponding controlled rectifier; and c. a corresponding plurality of impedance means, each connected in series with its corresponding secondary winding, each series combination of impedance means and secondary winding being connected in parallel with its corresponding primary winding, each secondary winding being poled so that current flowing from the source through the forward direction of said controlled rectifiers and through said primary and secondary windings produces opposing flux in the cores, each impedance means presenting a low impedance to current flowing in the forward direction of its corresponding controlled rectifier and in its corresponding secondary winding and a higher impedance to current flowing in the reverse direction of its corresponding controlled rectifier and in its corresponding secondary winding, the values of said higher impedances being selected so that the duration of reverse current flow in each controlled rectifier is approximately equal.

4. A circuit as recited in claim 3 wherein each impedance means comprises:

a. a diode poled to conduct current from the source to the load through the forward direction of the diode; and b. a resistor connected in parallel with the diode, the value of the resistor determining said duration of reverse current flow through its corresponding controlled rectifier.

5. A circuit for controlling current flow between a source and a load comprising:

a. controlled rectifier means adapted to be connected in series with the source and the load for selectively controlling the flow of current from the source to the load;

b. a saturable reactor having primary winding and secondary windings wound on a core, said primary winding connected in series with the controlled rectifier and the load; and c. impedance means connected in parallel with the saturable reactor secondary winding, said impedance means presenting a low impedance to the induced current flowing in the secondary winding due to current flowing from the source through the forward direction of the controlled rectifier and in the primary winding, and presenting a higher impedance to the induced current flowing in the secondary winding due to current flowing in the reverse direction of the controlled rectifier and in the primary winding, whereby the duration of said reverse current flow can be adjusted by varying the magnitude of said higher impedance.

6. A circuit as recited in claim 5 wherein the impedance means comprises:

a. a diode poled to conduct current flowing through the secondary winding in the forward direction of the diode when current is flowing through the forward direction of the controlled rectifier; and b. a resistor connected in parallel with the diode, the value of the resistor determining the duration of reverse current flow.

7. A circuit for controlling current flow between a source and a load comprising:

a. a plurality of controlled rectifier means similarly poled and adapted to be connected in series with the source and the load for selectably controlling the flow of current from the source to the load;

b. a corresponding plurality of saturable reactors each having a primary winding and a secondary winding wound on a core, said primary windings being connected in series with its corresponding controlled rectifier; and c. a corresponding plurality of impedance means, each connected in parallel with its corresponding secondary winding, each impedance means presenting a low impedance to the induced current flowing in its corresponding secondary winding due to current flowing from the source to the load through the forward direction of its corresponding controlled rectifier, and producing a higher impedance to the induced current flowing in its corresponding secondary winding due to current flowing in the reverse direction of its corresponding controlled rectifier, the values of said higher impedances being selected so that the duration of reverse current flow in the corresponding controlled rectifier is approximately equal.

8. A circuit as recited in claim 7 wherein each impedance means comprises:

a. a diode poled to conduct current flowing through its corresponding secondary winding in the forward direction of the diode when current is flowing in the forward direction of its corresponding controlled rectifier; and b. a resistor connected in parallel with the diode, the value of the resistor determining the duration of reverse current flow in its corresponding controlled rectifier.

9. A circuit for controlling current flow between a source and a load comprising:
   a. controlled rectifier means adapted to be connected in series with the source and the load for selectably controlling the flow of current from the source to the load;
   b. a saturable reactor having primary and secondary windings wound on a core, said primary winding connected in series with the controlled rectifier and the load; and
   c. impedance means connected in series with the saturable reactor secondary winding, the series combination of the impedance and the secondary winding being connected in parallel with the primary winding, said secondary winding being poled so that current flowing from the source through the forward direction of the controlled rectifier and through the primary and secondary windings produces opposing flux in the core, said impedance means presenting a low impedance to current flowing in the forward direction of the controlled rectifier and in the secondary winding, and a high impedance to current flowing in the reverse direction of the controlled rectifier and in the secondary winding, the value of said low impedance being selected to produce some net flux in the core.

10. A circuit as recited in claim 9 wherein the impedance comprises:
    a. a diode poled to conduct current from the source to the load through the forward direction of the diode; and
    b. a resistor connected in series with the diode, the value of the resistor determining the amount of net flux produced in the core.

* * * * *